United States Patent
Mottin et al.

(10) Patent No.: US 9,731,373 B2
(45) Date of Patent: Aug. 15, 2017

(54) METHOD FOR WELDING AND FOR HARD SURFACE DEPOSITION OF METAL PARTS MADE OF ALUMINIUM BY A MIG METHOD WITH PULSED CURRENT AND FILLER WIRE

(71) Applicants: SNECMA, Paris (FR); CENTRE NATIONAL DE LA RECHERCHE SCIENTIFIQUE (C.N.R.S.), Paris (FR); UNIVERSITÉ PARIS SUD (UPS), Orsay (FR); UNIVERSITÉ DE NANTES, Nantes (FR)

(72) Inventors: Jean-Baptiste Mottin, Poitiers (FR); Jean-François Castagne, Bourg la Reine (FR); Thierry Baudin, Gif sur Yvette (FR); Alexandre Yann Michel Benoit, Nantes (FR); Pascal Paillard, Ligne (FR)

(73) Assignees: SNECMA, Paris (FR); CENTRE NATIONAL DE LA RECHERCHE SCIENTIFIQUE (CNRS), Paris (FR); UNIVERSITE PARIS SUD (UPS), Orsay (FR); UNIVERSITE DE NANTES, Nantes (FR)

( * ) Notice: Subject to any disclaimer, the term of this patent is extended or adjusted under 35 U.S.C. 154(b) by 413 days.

(21) Appl. No.: 14/347,565

(22) PCT Filed: Sep. 27, 2012

(86) PCT No.: PCT/FR2012/052184
§ 371 (c)(1),
(2) Date: Mar. 26, 2014

(87) PCT Pub. No.: WO2013/045844
PCT Pub. Date: Apr. 4, 2013

(65) Prior Publication Data
US 2014/0217068 A1    Aug. 7, 2014

(30) Foreign Application Priority Data

Sep. 27, 2011 (FR) .................................. 11 58622

(51) Int. Cl.
*B23K 9/04* (2006.01)
*B23K 9/09* (2006.01)
(Continued)

(52) U.S. Cl.
CPC ................ *B23K 9/173* (2013.01); *B23K 9/04* (2013.01); *B23K 9/046* (2013.01); *B23K 9/09* (2013.01);
(Continued)

(58) Field of Classification Search
CPC .......... B23K 9/17; B23K 9/173; B23K 9/048; B23K 9/044; B23K 9/09; B23K 9/235;
(Continued)

(56) References Cited

U.S. PATENT DOCUMENTS 4,590,358 A * 5/1986 Stol ........................ B23K 9/123
219/136
4,912,299 A * 3/1990 Oros .................... B23K 33/006
219/137 PS
(Continued)

FOREIGN PATENT DOCUMENTS

EP      1 955 804     8/2008
EP      1 961 513     8/2008
(Continued)

OTHER PUBLICATIONS

International Search Report as issued for International Application No. PCT/FR2012/052184, dated Jan. 22, 2013.

*Primary Examiner* — Brian Jennison
(74) *Attorney, Agent, or Firm* — Pillsbury Winthrop Shaw Pittman LLP

(57) ABSTRACT

A method for hard surface deposition on aluminum metal parts of a turbine engine using MIG welding equipment
(Continued)

which includes a pulsed current generator and pulsed filler metal wire feed, wherein the deposition is achieved using a filler metal wire whose composition is of the same nature as the composition of the aluminum alloy of the part to undergo hard surface deposition, with the pulsed metal wire feed and speed of deposition on the metal part of the turbine engine being adapted to carry out deposition without hot fissuring.

7 Claims, 3 Drawing Sheets

(51) Int. Cl.
| | |
|---|---|
| B23K 9/173 | (2006.01) |
| B23P 6/00 | (2006.01) |
| F01D 25/24 | (2006.01) |
| F01D 21/04 | (2006.01) |
| B23K 26/32 | (2014.01) |
| B23K 26/342 | (2014.01) |
| B23K 35/28 | (2006.01) |
| B23K 35/02 | (2006.01) |
| B23K 101/00 | (2006.01) |
| B23K 103/20 | (2006.01) |
| B23K 103/08 | (2006.01) |
| B23K 103/10 | (2006.01) |
| B23K 103/18 | (2006.01) |

(52) U.S. Cl.
CPC ............ *B23K 26/32* (2013.01); *B23K 26/342* (2015.10); *B23K 35/0261* (2013.01); *B23K 35/286* (2013.01); *B23P 6/007* (2013.01); *F01D 21/045* (2013.01); *F01D 25/243* (2013.01); *B23K 2201/001* (2013.01); *B23K 2203/08* (2013.01); *B23K 2203/10* (2013.01); *B23K 2203/18* (2013.01); *B23K 2203/20* (2013.01); *F05D 2230/235* (2013.01); *F05D 2230/30* (2013.01); *F05D 2230/80* (2013.01)

(58) Field of Classification Search
CPC .. B23K 26/342; B23K 26/32; B23K 35/0261; B23K 35/286; B23K 2201/001; B23K 2201/08; B23K 2203/20
See application file for complete search history.

(56) References Cited

U.S. PATENT DOCUMENTS

| | | | |
|---|---|---|---|
| 2005/0050705 A1* | 3/2005 | Segletes | F01D 5/005 29/402.13 |
| 2008/0199344 A1* | 8/2008 | Chau | B23K 26/0661 419/8 |
| 2009/0014421 A1* | 1/2009 | Sathian | B23K 9/044 219/75 |
| 2009/0017328 A1* | 1/2009 | Katoh | B23K 9/173 428/653 |
| 2011/0072660 A1* | 3/2011 | Flesch | B23K 9/048 29/888 |

FOREIGN PATENT DOCUMENTS

| | | |
|---|---|---|
| FR | 2 931 714 | 12/2009 |
| WO | WO 2009/144301 | 12/2009 |

* cited by examiner

METHOD FOR WELDING AND FOR HARD SURFACE DEPOSITION OF METAL PARTS MADE OF ALUMINIUM BY A MIG METHOD WITH PULSED CURRENT AND FILLER WIRE

CROSS REFERENCE TO RELATED APPLICATIONS

This application is the U.S. National Stage of PCT/FR2012/052184, filed Sep. 27, 2012, which in turn claims priority to French Patent Application No. 1158622, filed Sep. 27, 2011, the entire contents of all applications are incorporated herein by reference in their entireties.

The present invention relates to a method for hard surface deposition on metal parts made of aluminium by means of a MIG (Metal Inert Gas) method.

The invention finds a particularly beneficial application in the field of reconstruction of aluminium metal parts of a turbine engine and in the welding of aluminium metal parts by hard surface deposition of filler metal.

More specifically, the hard surface deposition method according to the invention is advantageously used for the repair of mounting flanges of a retaining housing of a turbine engine by hard surface deposition of material in order to create a volume of discontinuous material.

The creation of a volume of discontinuous material is currently achieved using methods such as forging, casting or by welding of two parts. These methods are, however, relatively costly and not suited for low volumes or for parts with a complex geometry.

TIG type welding (Tungsten Inert Gas) is also known. This is a method of arc-welding with a non-fusible electrode under an inert gas. This technique can be used with filler metal, in particular for the construction or hard surface deposition of metal parts.

Since aluminium, however, is a material that is difficult to weld and with high thermal conductivity, in the construction or hard surface deposition using TIG welding of aluminium metal parts, such as, for example, containment case mounting flanges, the surrounding areas are severely affected by heat, in particular on the skin of the casing during the repair of retaining housing mounting flanges, resulting in a significant diminution of the mechanical characteristics of the affected parts. Consequently this TIG hard surface deposition method is unacceptable and exhibits many drawbacks, since it diminishes the mechanical characteristics of the repaired metal parts. Thus during the repair of a mounting flange for a retaining housing, the latter's capacity to retain projected objects is reduced due to the diminution of the mechanical characteristics of the skin of the casing through the use of a TIG method.

A method for the construction of a metal component part using a pulsed current and wire MIG method has therefore been proposed which can be used to create beads of filler metal of large cross-section (in particular greater than 25 $mm^2$) whilst minimising the heat affected zone and therefore embrittlement of the part.

This pulsed current and wire MIG method, which is an improvement of the welding method known as CMT (Cold Metal Transfer) is described in a more detailed manner in patent application FR2931714.

It is well known however that the welding of aluminium alloys can give rise to hot-cracking phenomena. These cracks typically appear at the end of solidification of the molten zone when the latter is in a semi-solid state. The cracks are caused by stresses caused by the cooling and clamping of the parts. Since this phenomenon is directly linked to the composition of the filler metal, the use of a filler metal which has a specific composition which differs from the composition of the part to undergo hard surface deposition is known.

Thus, by way of an example, in order to carry out the hard surface deposition on a metal part made of aluminium alloy with a composition 6061, it is common to use a metal made of aluminium alloy with a composition 4043 or again a composition 5356.

The use, however, of a filler metal with a specific composition which differs from the part to be repaired does not result in mechanical characteristics which are identical to the original part made, for example, of aluminium alloy 6061, since the mechanical characteristics of the alloy composition of the filler metal are inferior to the mechanical characteristics of the alloy composition of the part to be repaired.

The part undergoing hard surface deposition consequently has reduced strength and operational life in relative to the original part.

In this context the aim of the invention is to provide a method for hard-surface deposition on aluminium metal parts by means of a pulsed current and wire MIG method which improves the mechanical characteristics of the repaired part and which offers mechanical characteristics of the repaired part which are comparable to the mechanical characteristics of the original part.

To this end the invention proposes a method for hard surface deposition on aluminium metal parts of a turbine engine using MIG welding equipment which includes a pulsed current generator and pulsed filler metal wire feed, said procedure being characterised in that said hard surface deposition is achieved using a filler metal wire whose composition is of the same nature as the composition of the aluminium alloy of said part to undergo hard surface deposition, with said pulsed metal wire feed and speed of hard surface deposition of the metal part of the turbine engine being suitable for carrying out hard surface deposition without hot fissuring.

Thus the method according to the invention allows homogeneous hard surface deposition to be carried out (i.e. with a filler metal of the same grade as the base aluminium alloy) on an aluminium metal part with controlled hard surface deposition parameters whilst carrying out hard surface deposition in a working domain which excludes the risk of hot cracking.

Furthermore, the use of a fully controllable method such as the MIG method facilitates reproducibility of achievement of conditions for homogeneous hard surface deposition of material and consequently reproducibly ensuring the absence of hot cracking.

The particular method according to the invention also has the advantage of being able to deposit significant volumes of material whilst minimising the heat affected zone and hence minimising embrittlement of the part. Thus the method according to the invention may advantageously be used for hard surface deposition or welding of parts of low thickness.

Advantageously, the hard surface deposition method according to the invention is supplemented using a post-deposition heat treatment step so as to improve the mechanical characteristics of the part undergoing hard surface deposition. As a result of the heat treatment the part that undergoes hard surface deposition possesses mechanical characteristics which are substantially identical to the original part.

The objective of the thermal cycle is to dissolve the precipitates (solution annealing) then to re-precipitate them in a homogeneous and controlled manner (precipitation tempering) so as to improve the mechanical strength of the part undergoing hard surface deposition.

The hard surface deposition method according to the invention is intended both for the construction of a volume of material on a substrate (i.e. on an original part) and for the welding of two parts using a filler metal of the same grade as the two original parts.

The method for the hard surface deposition on aluminium metal parts of a turbine engine using MIG welding equipment which includes a pulsed current generator and a pulsed filler metal wire feed according to the invention may also exhibit one or more of the characteristics below, considered individually or according to all the technically possible combinations:

the method includes a heat-treatment step;

for the reconstruction of a metal part made of aluminium alloy of grade 6061, the hard surface deposition speed is between 50 cm/min and 120 cm/min;

for welding of mechanical parts made of aluminium alloy of grade 6061, with hard surface deposition of filler metal, the welding speed is between 40 cm/min et 100 cm/min;

said method involves a step for heat treatment of the deposited metal so as to optimise the mechanical characteristics of the part that has undergone hard-surface deposition;

said heat treatment consists of:
 a first solution sub-step:
 a second hyper-tempering sub-step:
 a third tempering sub-step.

Another subject of the invention is a method for the repair of a turbine engine retaining housing which includes at least one mounting flange to be repaired, which successively comprises:

a step for the shaving of the mounting flange to be repaired:

a step for the reconstruction of said mounting flange by a hard surface deposition method according to the invention;

a step for machining of said deposited metal in order to achieve a final geometry of said mounting flange.

As a result of the method according to the invention, it is possible to repair a retaining housing for the rotor of a turbine engine simply, quickly and whilst guaranteeing mechanical properties identical to those of the original casing using a method of reconstruction of material by MIG welding which reconstructs a flange starting from the shaved surface of the casing flange.

This method thus provides a real repair solution for turbine engine retaining housings whilst guaranteeing their containment ability in a long term manner after repair so that it is equivalent to that of the original retaining housings, through the use of a filler metal of an identical composition to the original part.

This means that the use of the method for the reconstruction of material by MIG welding in addition reduces the size of the Heat Affected Zone (HAZ) by a factor of three relative to a conventional arc-welding method, allowing a reconstruction of a retaining housing mounting flange to be carried out without adversely affecting the strength of the skin of the casing and without affecting the thickness of the skin which is certified during the design of the casing for containment.

This method also allows the cost of replacing a retaining housing to be avoided.

Other characteristics and advantages of the invention will emerge more clearly from the description of it that is given below, by way of an indication and which is in no way restrictive, with reference to the appended figures in which.

In all the figures the common elements carry the same reference numbers unless otherwise stated.

The hard surface deposition method according to the invention finds a particularly beneficial application in the field of repair of retaining housing flanges of a turbine engine fan.

Thus an example of the application of the hard surface deposition method according to the invention will be described below for the repair of a retaining housing flange of a turbine engine.

Figure 1:
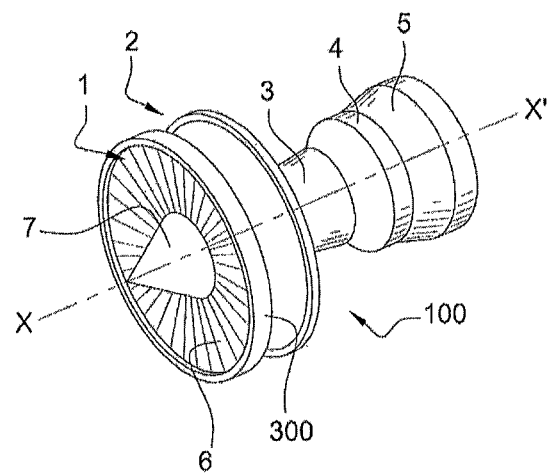
FIG. 1 is a schematic view of an aircraft turbine engine.

FIG. 1 is a highly schematic view of a turbine engine which includes, moving from upstream to downstream in the direction of flow of gaseous streams, a fan 1 positioned at the inlet of the turbine engine 100, a compressor 2, a combustion chamber 3, a high-pressure turbine 4 and a low-pressure turbine 5. The fan 1 is made up of a rotating shaft 7 on which multiple blades 6 are mounted.

The turbine engine 100 includes a retaining housing 300 which circumferentially surrounds the fan 1, where the retaining housing 300 is suitable for containing any foreign matter thrown radially by centrifugal force during the rotation of the blades 6. This means that during the operation of the turbine engine 100, material that is foreign to the turbine engine 100, such as ice, for example, may be ingested by the fan 1, and then thrown radially under the action of the rotational centrifugal force.

Figure 2:
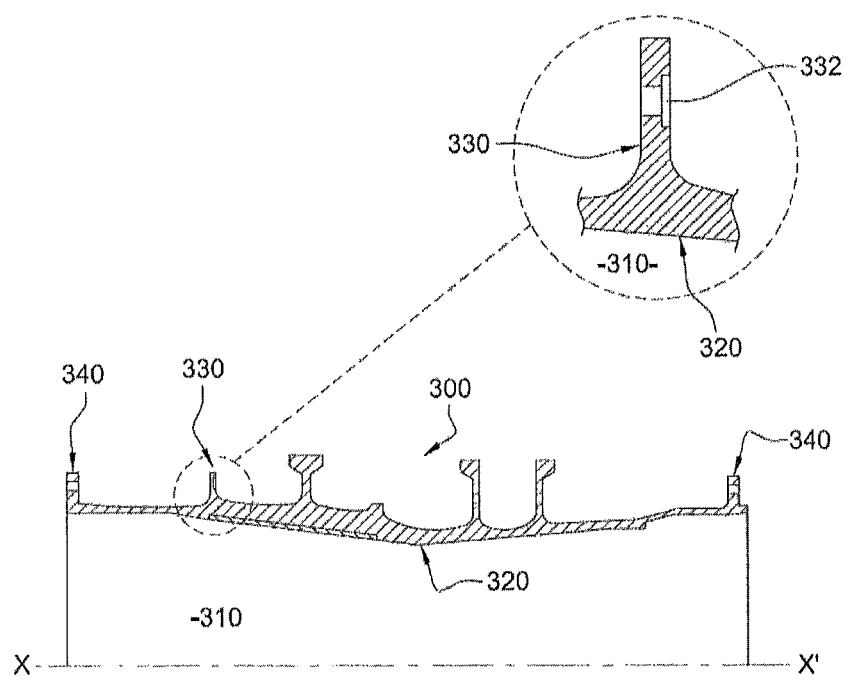
FIG. 2 is a partial view in section of a retaining housing for a turbine engine which is in need of repair.

The retaining housing 300 is illustrated in more detail in FIG. 2.

The internal surface 320 of the retaining housing 300 defines the stream of air 310 entering the turbine engine 100. The retaining housing 300 includes, at its ends, external flanges 340 allowing it to be mounted and connected to other elements of the turbine engine 100. Between the end flanges 340 located at the ends of the casing 300, the casing 300 is of variable thickness, with a central part of greater thickness than the end parts. The thickness of the skin of the casing 300 governs its containment ability. Conventionally the retaining housing is made of an aluminium alloy, for example of type 6061.

The retaining housing 300 also includes multiple external intermediate flanges 330 located between the end flanges 340. The intermediate flanges 330 are also distributed over the peripheral circumference of the casing 300, generally in a substantially radial manner, and allow various items of equipment or equipment supports to be mounted, such as pipework, harnesses etc.

During the life of the turbine engine, the various items of equipment supports may loosen slightly and lead to premature wear/and or ovalisation of the mounting orifices 332 of the intermediate flanges 330. When the damaged zone is too large, the flanges 330 no longer perform their function and they must then be repaired.

In the present description the intermediate flange 330 will be referred to both as a flange or as a mounting flange.

Prior to the hard surface deposition of material onto the casing, the flange to be repaired must be prepared.

Figure 3:
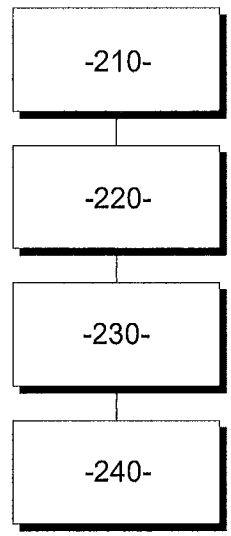
FIG. 3 is an overview diagram showing the main steps in an example of the hard surface deposition method according to the invention applied to the repair of a retaining housing of a turbine engine according to the invention.

In order to do this, the first step 210 in the method 200 illustrated in FIG. 3 is a step involving the partial shaving to a varying degree of part of the worn flange 330, where the part to be shaved is principally determined as a function of the of state of wear of the flange 330 and of the wear propagation zone.

Figure 4:
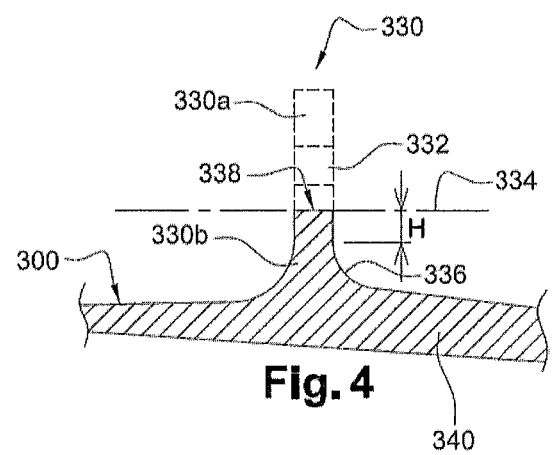
FIG. 4 is a partial view in section of a retaining housing for a turbine engine during the first step of the method illustrated in FIG. 3.

This step is illustrated in particular in FIG. 4 wherein the section to be shaved is illustrated, by way of an example, by the horizontal line 334 which separates the flange 330 into an upper part 330*a* and a lower part 330*b,* where the upper part 330*a* of the worn flange 330 is machined during this first step.

The second step 220 of the method 200 is a step involving the preparation of the surface 338 of the remaining part of the flange 330 with the intention of carrying out hard surface deposition of material on it. This surface preparation step involves, for example, mechanical machining and/or chemical cleaning using, for example, alcohol etc.

Figure 5:
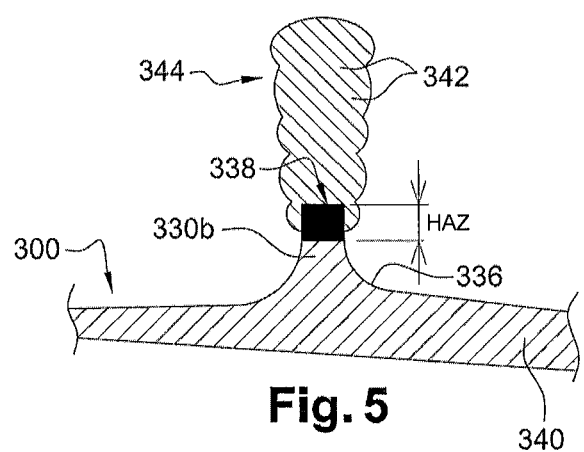
FIG. 5 is a partial view in section of a retaining housing for a turbine engine during the third step of the method illustrated in FIG. 3.

The third step 230 of the method 200 according to the invention is a step involving reconstruction of the upper part 330*a* of the flange 330 by a mass hard surface deposition of material (or filler metal), using a pulsed current and pulsed filler metal wire feed MIG ('Metal Inert Gas') type arc welding method. This third step 230 in the repair method 200 is represented in more detail in FIG. 5. In effect FIG. 5 illustrates a sectional view of the flange 330 after the material deposition step.

The hard-surface deposition of material is achieved by superimposing beads of metal material 342 (or of filler metal), with large cross-sections, onto the surface 338 of the lower part 330*b* of the flange 330. The number of passes, that is the number of beads of material 342 to be applied, is determined depending on the desired height of material as well as on the width of the beads defined.

The MIG welding method allows part of components to be constructed or reconstructed as a result of the high rate of deposition in the form of beads of significant cross-sectional area. The length and the width of the hard surface deposition beads are defined by the operator as a function of the wire feed rate.

The filler metal used is a filler metal with an aluminium alloy grade which is identical to that of the aluminium alloy of the retaining housing (i.e. aluminium alloy of grade 6061).

The hard surface deposition method using MIG welding enables the work to be carried out at cooler temperatures than the working temperatures for other arc welding methods. Thus the method according to the invention favours rapid cooling of the bead and consequently results in a low holding time in the Brittle Temperature Range (BTR) at between 582° C. and 652° C. for aluminium alloy 6061.

Thus the particular heat cycle for the method according to the invention allows a particular micro-structure to be generated which is finer than that encountered with other welding methods, in particular at the surface of the beads 342, thus, by working with suitable parameters described below, avoiding hot cracking phenomena.

Figure 6:
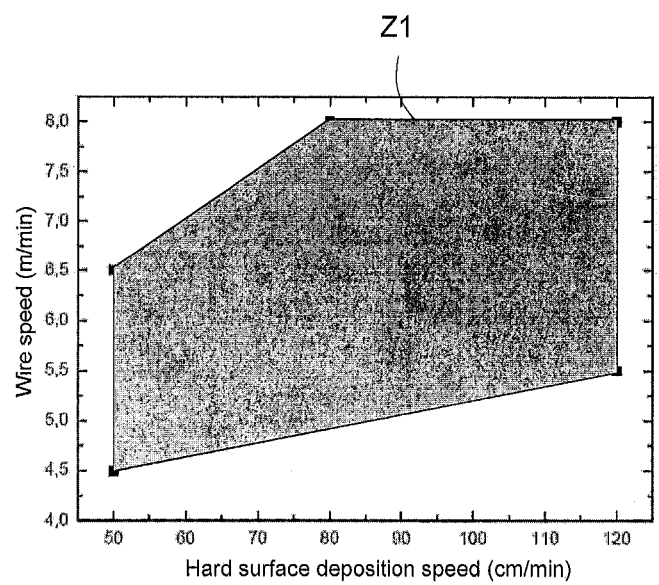
FIG. 6 is a graph illustrating an example of welding parameters for carrying out the hard surface deposition of material with the hard surface deposition method according to the invention.

According to one advantageous embodiment of the invention, the range of parameters for the method according to the invention for carrying out hard surface deposition of material (i.e. reconstruction of material) from a wire of alloy filler metal 6061 of diameter 1.2 mm is defined in the greyed out zone Z1 of the graph illustrated in FIG. 6.

Thus the deposition speed is between 50 cm/min, and 120 cm/min with, for example, for a hard surface deposition speed of 50 cm/min, a wire speed between 4.5 m/min and 6.5 m/min and for a hard surface deposition speed of 120 cm/min, a wire speed of between 5.5 m/min and 8 m/min.

Figure 7:
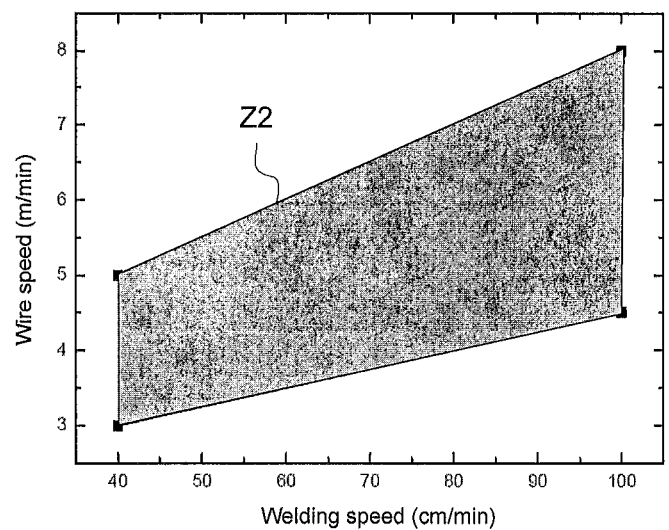
FIG. 7 is a graph illustrating an example of welding parameters for carrying out welding with filler metal with the hard surface deposition method according to the invention.

According to another example of an embodiment of the invention, the range of parameters for the method according to the invention for carrying out welding with filler metal of alloy 6061 of diameter 1.2 mm is defined in the greyed out zone Z2 of the graph illustrated in FIG. 7.

Thus the welding speed is between 40 cm/min and 100 cm/min, with a wire speed of between 3 m/min and 5 m/min for a welding speed of 40 cm/min and with a wire speed of between 4.5 m/min and 8 m/min for a welding speed of 100 cm/min.

These ranges of parameters are given by way of examples for an aluminium alloy of a given grade, a given wire diameter and a given ambient temperature. It is to be understood that the ranges of parameters described may vary slightly depending on the diameter of the wire, on the ambient temperature and on the grade of aluminium used.

It may be, however, that end shrinkage of varying sizes of bead is still present. On the other hand, this is exclusively located in the end part of the bead in the hard surface deposition zone which will subsequently be machined in order to achieve the final geometry of the mounting flange 330.

The hard surface deposition method also includes an optional fourth heat-treatment step 240. The heat-treatment is for example, for the alloy 6061, heat treatment of type T6 in the international classification, consisting of solution (20 min at 530° C.), followed by hyper-tempering and then an 8-hour tempering at 175° C.

The heat treatment thus allows the built-up component (i.e. the flange) to possess mechanical characteristics which are identical to the original component.

The hard surface deposition method according to the invention has been principally described for a use of the type involving hard surface deposition of a flange of a turbine engine retaining housing. The invention however, is not restricted to this embodiment. By way of an example, the method according to the invention could also be used to carry out welding, with a filler metal, of several sections of a retaining housing. In this particular embodiment of the invention, the range of welding parameters illustrated in FIG. 7 would be used.

The invention claimed is:

1. A method for hard surface deposition on an aluminium alloy metal part of a turbine engine, the method comprising:
    depositing an aluminium alloy on said aluminium alloy metal part using a MIG welding equipment which includes a pulsed current generator and pulsed filler metal wire feed, said depositing using a filler metal wire of said aluminium alloy, the aluminium alloy of said filler metal wire and the aluminium alloy of the metal part to undergo said hard surface deposition being the same aluminium alloy, with said pulsed metal wire feed and speed of deposition on the aluminium alloy metal part of the turbine engine being selected so that said deposition is carried out without hot fissuring said aluminium alloy metal part.

2. The hard surface deposition method according to claim 1, comprising performing a heat treatment.

3. The hard surface deposition method according to claim 1, further comprising reconstructing the aluminium alloy metal part made of aluminium alloy of grade 6061 with the deposition speed between 50 cm/min and 120 cm/min.

4. The hard surface deposition method according to claim 1, further comprising welding mechanical parts made of aluminium alloy of grade 6061, with hard surface deposition of filler metal, and with a welding speed between 40 cm/min and 100 cm/min.

5. The hard surface deposition method according to claim 1, comprising performing a heat treatment of the metal undergoing hard surface deposition so as to optimise mechanical characteristics of the part that has undergone hard surface deposition.

6. The hard surface deposition method according to claim 5, wherein said heat treatment consists of:
 a first solution sub-step:
 a second hyper-tempering sub-step:
 a third tempering sub-step.

7. A repair method for a retaining housing of a turbine engine which includes at least one mounting flange to be repaired, said method successively including:
 shaving the mounting flange to be repaired:
 reconstructing said mounting flange by a hard surface deposition method according to claim 1;
 machining said deposited metal in order to achieve a final geometry of said mounting flange.

* * * * *